B. F. KELLEY.
ROTARY GRIEF COLLAR.
APPLICATION FILED JAN. 12, 1918.

1,281,977. Patented Oct. 15, 1918.

Inventor
B. F. Kelley,
By Victor J. Evans
Attorney

Witnesses
J. H. Crawford
F. Hough

UNITED STATES PATENT OFFICE.

BENJAMIN FRANKLIN KELLEY, OF TULSA, OKLAHOMA, ASSIGNOR OF ONE-FOURTH TO LE ROY McCOLLUM, OF TULSA, OKLAHOMA, ONE-FOURTH TO DORSE D. MYERS, OF TULSA, OKLAHOMA, AND ONE-FOURTH TO WILLIAM K. HUGHES, OF ST. LOUIS, MISSOURI.

ROTARY GRIEF-COLLAR.

1,281,977.   Specification of Letters Patent.   Patented Oct. 15, 1918.

Application filed January 12, 1918. Serial No. 211,648.

*To all whom it may concern:*

Be it known that I, BENJAMIN F. KELLEY, a citizen of the United States, residing at Tulsa, in the county of Tulsa and State of Oklahoma, have invented new and useful Improvements in Rotary Grief-Collars, of which the following is a specification.

This invention relates to a coupling which is primarily intended for connecting the pipe sections associated with the drill bit in well-boring machines wherein the pipe connected with the bit is connected with and turned by a rotatable table.

With the coupling now in use owing to the great strain to which the pipe sections are subjected as the pipe is turned, it frequently happens that an end of a pipe section is forced within an end of a pipe section connected therewith which not only results in injury to the coupling and pipe sections associated therewith, but permits the damaged pipe section to become disengaged from the coupling through the stripping of the threads, so that considerable time and labor is required to recover the drill bit.

To overcome these difficulties the primary object of the invention is to provide a coupling for the sections of a pipe of the character described which is so constructed as to not only prevent the ends of the pipe section from being forced into contact with each other, but insures the threaded portions of the pipe sections being held firmly against the threaded walls of the coupling, thereby preventing telescoping of the pipe sections and the subsequent stripping of the threads which results in the disconnection of the sections.

With these and other objects in view, the invention resides in the novel combination and arrangement of parts, which will be hereinafter described and particularly pointed out in the claim.

The preferred embodiment of the invention has been illustrated in the accompanying drawings, although no restriction is necessarily made to the precise details of construction therein shown, as changes, alterations, and modifications within the scope of the claim may be resorted to when desired.

In the drawings:—

Like characters of reference denote corresponding parts throughout the several views in the drawing.

Figure 2:
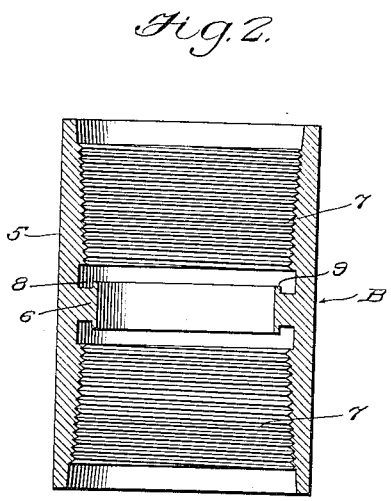
Fig. 2 is a longitudinal sectional view through the coupling.

Referring now to the drawing in detail the letter A designates a portion of a pipe for use in connection with a drill bit associated with a well drilling machine wherein the pipe is connected with and turned by a rotatable table. The pipe sections which are adapted to serve as the well casing are tapered for a portion of their length adjacent each end and these tapered portions are threaded for the greater portion of their length for a purpose which will hereinafter appear.

Figure 1:
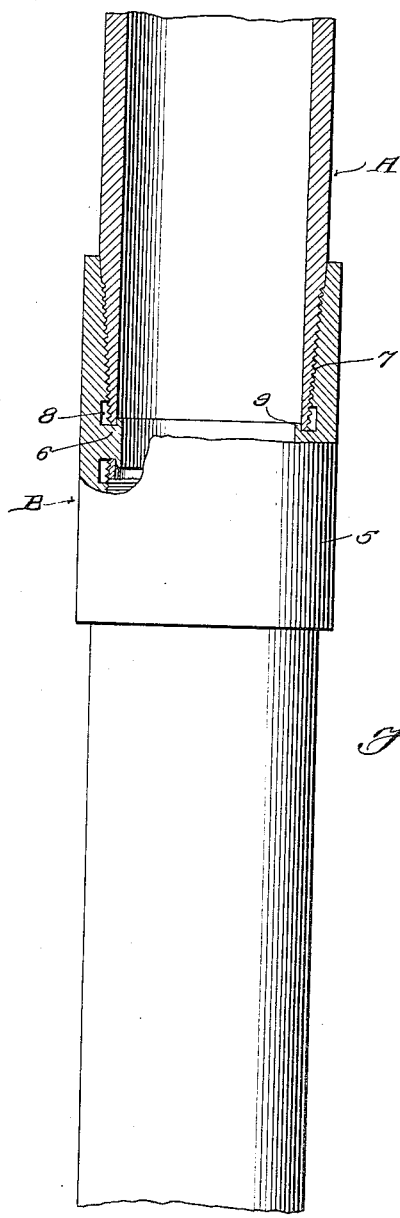
Figure 1 is a view in side elevation partly in section wherein a portion of a pair of pipe sections are shown connected by a coupling construction in accordance with the invention.
Figure 3:
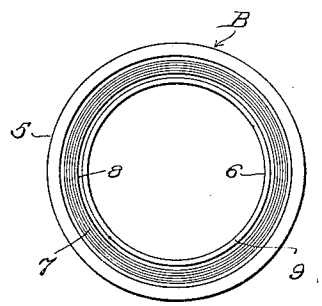
Fig. 3 is an end elevation thereof.

The coupling B when constructed in accordance with the invention is in the form of a band 5 which has formed therefrom interiorly of the band an annular flange 6 which is interposed between and spaced from the sets of threads 7 on the inner wall of the band for engagement with the threads on the pipe sections A. It will be noted with reference to Figs. 1 and 2 in the drawing that the threaded portions of the band do not extend to the ends of the band and gradually decrease in diameter from their outer toward their inner ends, as I find that by threading the band 5 as shown, the pipe sections can not only be more quickly connected with the coupling than is possible with couplings of this character now in use, but the pipe sections are enabled to coact with the inclined walls of the coupling in preventing movement of the pipe sections toward the flange 6.

Formed in opposite sides of the flange 6 are annular grooves 8 in which the confronting ends of the pipe sections A seat. Thus the confronting ends of the pipe sections are positively prevented from being forced into contact with each other while the pipe of which the sections form a part is being driven.

By grooving the flange 6 as above described the flange is provided with a pair of circumferentially extending ribs 9 which extend within the confronting ends of the pipe sections and bear on the peripheral wall thereof, so that the threaded portions of the pipes are held firmly against the threaded walls of the coupling, thus preventing the distorting of the ends of the pipe sections which permits the pipe sections to telescope and results in the stripping of the threads from the distorted pipe sections and coupling and allows the pipe sections to become disconnected.

Should by any chance the strain upon the pipe sections reach such a degree that they would have a tendency to move toward each other it will be noted with reference to the drawing that by tapering the ends of the pipe sections and spacing the flange 6 from the inner end of the threaded walls of the coupling, the ribs 9 would cause the ends of the pipe sections to be deflected toward the periphery of the coupling, so that the deflected ends of the pipe sections will prevent the separation of the damaged pipe section from the coupling.

From the foregoing description taken in connection with the accompanying drawing it is apparent that an inexpensive coupling has been provided which is highly efficient for preventing the cracking or distortion of the ends of articles connected thereby.

Having thus described the invention, what is claimed as new is:—

A coupling of the class described comprising a band having its inner peripheral wall threaded and inclined in opposite direction for a portion of the length of the coupling upon opposite sides of its transverse center line, an annular flange on the inner peripheral wall of said band interposed between and spaced from said oppositely inclined and threaded portions, said flange having an annular groove in opposite sides thereof, and circumferentially extending ribs formed on said flange by said grooves adapted to extend within and engage the peripheral wall of a pair of pipe sections connected by said band.

In testimony whereof I affix my signature.

BENJAMIN FRANKLIN KELLEY.